Dec. 17, 1929.  G. J. KALBERER  1,740,404
TRUCK
Filed Aug. 5, 1927     2 Sheets-Sheet 2
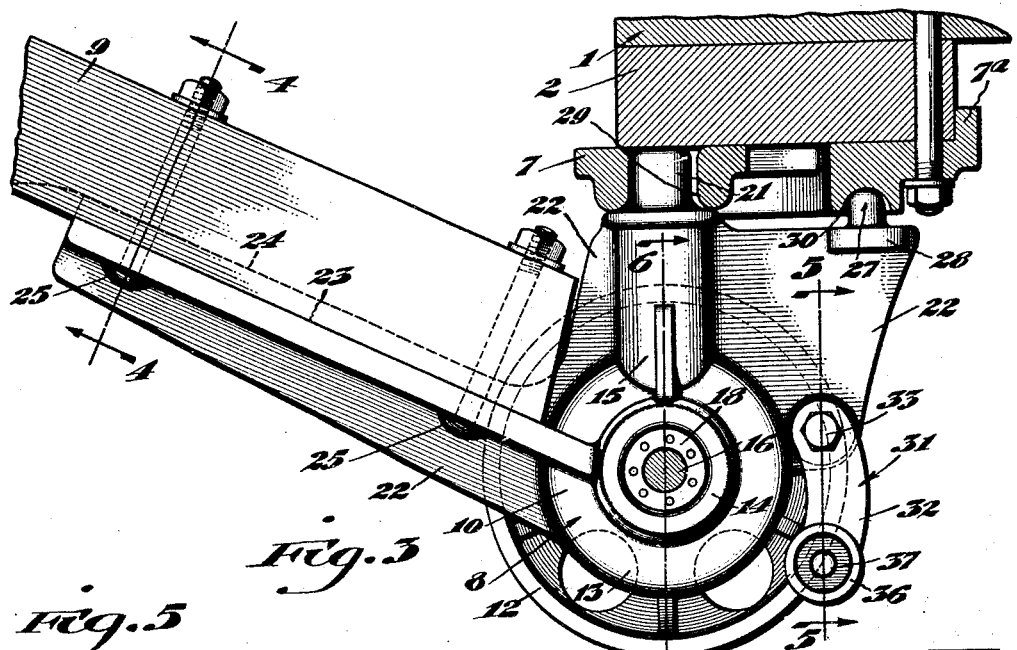
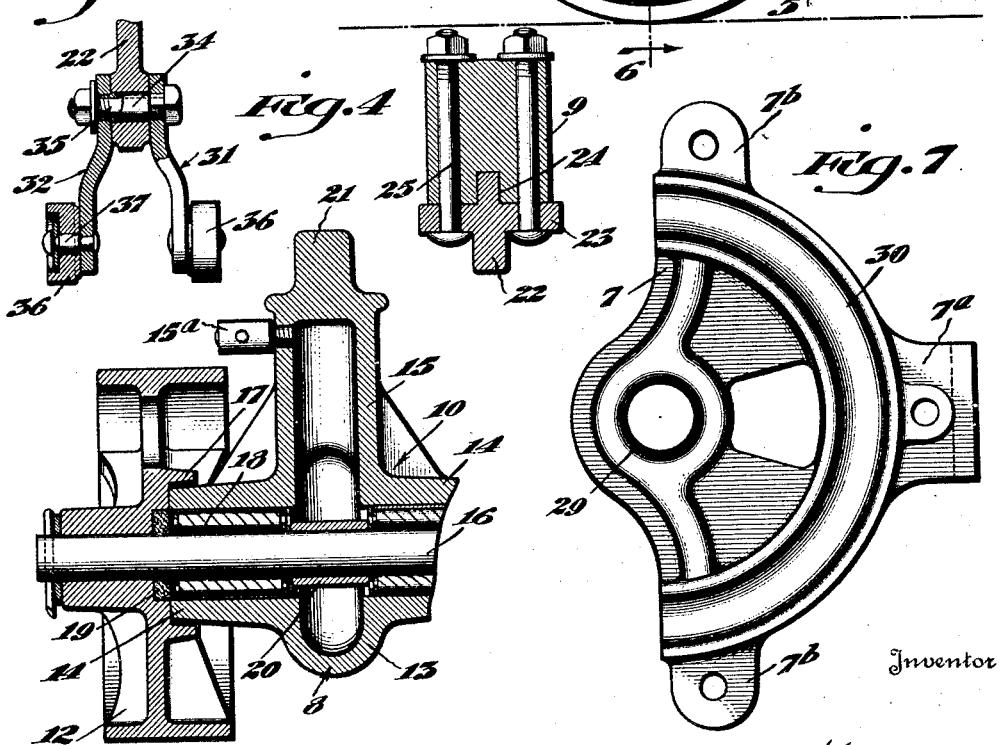
Inventor
George J. Kalberer
By Wind & Wind
Attorneys Patented Dec. 17, 1929

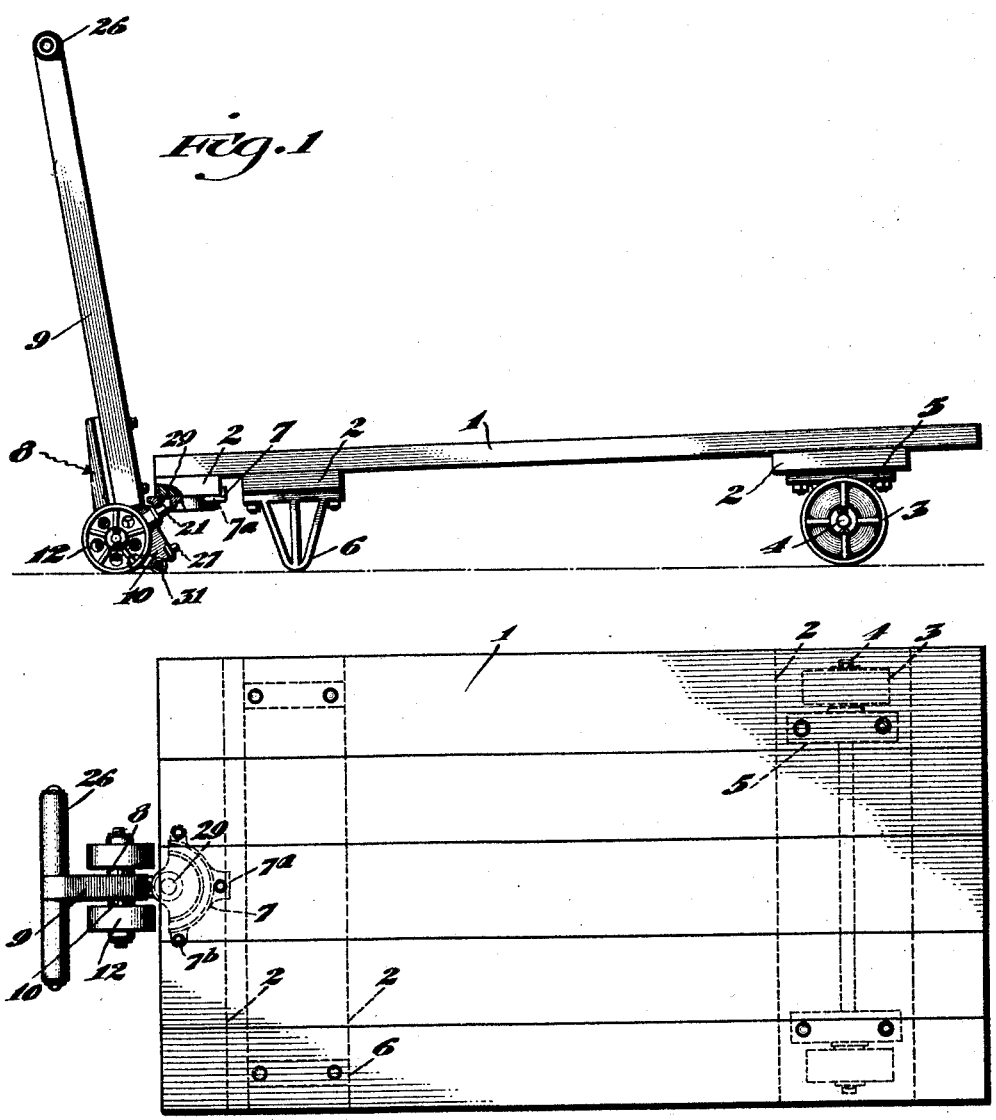

1,740,404

UNITED STATES PATENT OFFICE

GEORGE J. KALBERER, OF HAMILTON, OHIO

TRUCK

Application filed August 5, 1927. Serial No. 210,745.

This invention relates to hand trucks, and is particularly directed to a steering and lift truck having a propelling handle and adaptable for draft connection under the forward or rest end of a semi-wheeled trailer.

It is an object of this invention to provide a truck of this nature for making a pivotal draft connection with the trailer allowing truck rotation for steering the trailer, and embodying means for jacking up the trailer forward end beyond the height of normal draft connection when it is necessary to clear the rest legs at the trailer forward end to move the same over extremely irregular surfaces.

It is another object of the invention to provide that the jacking means between the truck and trailer afford a secondary draft connection in the event that the normal pivotal draft connection is momentarily disengaged by a substantial raising of the trailer forward end.

It is still another object of this invention to provide a truck of this character having an automatically positioned stop device mounted thereon for preventing sudden upward swing of the truck handle under the weight of the trailer load, this stop being optionally movable by truck manipulation for non-interference with the disengagement of the truck from the trailer and desired lowering of the trailer end to rest position.

Other objects relate to the construction of the steering or lift truck for ease of steering manipulation and engagement with the trailer end and also to the bearing and oiling features of the truck.

Other objects and certain advantages will be more fully disclosed in the description of the accompanying drawings forming a part of this specification, in which:

Figure 1 is a side elevation of the truck and trailer showing the truck in position prior to being engaged with the trailer by downward movement on the handle of the truck.

Figure 2 is a plan view of Figure 1.

Figure 3 is a detail view showing the truck in draft connection with the trailer and illustrating the jacking means in engagement with the trailer for additional raising of the trailer, some parts of the view being shown in section and others broken away to more clearly illustrate the structure.

Figure 4 is a detail sectional view taken on line 4—4, Figure 3, showing the connection of the handle to the body of the truck.

Figure 5 is a detail sectional view taken on line 5—5, Figure 3, illustrating the stop device mounted on the truck for preventing sudden upward swing of the handle under the weight of the trailer load.

Figure 6 is a detail sectional view taken on line 6—6, Figure 3, showing the interior construction of the truck body for proper lubrication and illustrating the bearing of the main shaft of the truck.

Figure 7 is a bottom view of the trailer coupler element showing the same removed from the trailer.

Referring to the drawings, the semi-wheel trailer is shown as of the platform type comprising a platform 1 and cross members 2. At the rear of the trailer a pair of wheels 3 are provided, the axle 4 carrying a wheel 3 at each end thereof, and being mounted in bearing brackets 5 secured to the underside of the rear cross piece 2. A pair of rest legs 6 are mounted at each side of the forward end of the trailer and are bolted to the underside of the forward cross piece 2. A fifth-wheel 7 is mounted centrally of and on the underside of another cross piece 2, this cross piece extending across the extreme forward end of trailer. The fifth-wheel has a lug 7ª having a lip extending upward and engaging the rear edge of the cross piece 2, the attaching of the fifth-wheel to the trailer being by means of carriage bolts extending through the trailer platform and the lug 7ª and side lugs 7ᵇ. The fifth-wheel is formed to provide the attaching means for a draft connection of the trailer and a steering truck hereinafter described.

These semi-trailers as described above are adapted to be used in fleets, being normally immovable because of the rest legs supporting the forward ends. A means for moving the trailers is provided in the nature of a steering or lift truck unit 8. This truck is readily placed in draft connection with the particular one of the semi-trailers desired to be moved. The steering and lift truck comprises generally a handle 9, a body portion 10 and a pair of wheels 12. The body 10 of the truck is a hollow exteriorly webbed structure, comprising a bulged central portion 13 concentric with the axle of the truck, forming a grease chamber, hubs 14 extending outwardly at each side thereof, and a tubular portion 15 extending upwardly from the bulged portion 13.

The axle 16 extending through the hubs 14 has the pair of wheels 12 mounted thereon, one at each side of the truck. The wheels are held in position against the hubs of the body by means of cotter pins and washers engaging the outer hubs of the wheels. Inner hubs 17 are provided on the wheels, these hubs overhanging the hubs 14 of the body preventing the entrance of dirt and grit into the body. The hubs 14 of the body house the roller bearings 18, and packing rings 19 are disposed in recesses in the inner faces of the wheel adjacent the outer ends of the body axle bore. A spacer collar 20 is provided on the axle between the rollers 18.

By the construction herein employed, the wheels are mounted on a floating axle and movement of the truck is extremely easy. The lubricant recess in the bulged body portion 13 surrounds the intermediate portion of the axle, so that grease is kept in constant proximity to the bearings 18 at the sides thereof.

The tubular portion 15 is of the same diameter as the width of the bulged portion 13 and forms a continuation of the grease chamber as a supply channel from the grease gun coupling 15ª screwed into the upper end of the portion 15. The upper end of the extension 15 is closed and an annular bead is formed thereon. A king pin 21 is formed at the outer end of the extension 15. Webs 22 extend laterally from the extension 15 and are formed to extend partly around the bulged portion 13. These webs 22 at one side of the body form reinforcing ribs for the handle attaching ribs 23 extending from each side of the webs 22 at right angles thereto. The combination of ribs at the handle engaging portion, as shown in Figure 4, make up a "cross" formation. The handle 9 throughout its length where it is secured to the handle engaging portion is notched as at 24 to fit over the upper reinforcing web 22.

Carriage bolts 25, at each side of the web 22, extend through the ribs 23, and secure the handle firmly upon the cross extension. The handle 9 is provided with a cross piece 26 at its upper end as the gripping member for steering the truck. The opposite web extension 22, adapted to extend under the trailer, carries a stud or pintle 27 formed upon and extending upwardly from the outer upper edge of the web. The web 22 is bossed as at 28 around the base of the pintle 27, so as to strengthen the cast structure, at this point.

The king pin 21 and pintle 27 are both disposed above the wheels of the truck and make up the lower fifth-wheel. The previously described handle extension extends out from the body at an acute angle in relation to the king pin 21 which is disposed radially of the axle center so that when the truck is in service position beneath the trailer the handle extends upwardly at the proper angle to be conveniently grasped by the operator. The king pin 21, as shown in Figure 1, is engageable into a socket 29 formed in the side of the fifth-wheel nearest the forward end of the truck. A groove 30 is provided in the underside of the fifth-wheel, being concentric with the socket 29. This groove 30 is semi-circular so as to provide the proper contour for engagement with the rounded head of the pintle 27. The king pin 21, when placed in the socket 29, as shown in Figure 1, is further entered into by drawing downward on the end of the truck handle, this action raising the trailer forward and upwardly and allowing the fifth-wheel socket to drop over the king pin. This engagement of the king pin and socket forms the draft connection between the steering truck and the trailer.

When the king pin 21 has completely entered into the socket 29, the rest legs 6 of the trailer are sufficiently off the floor to allow the forward end of the truck to be freely manipulated, and the trailer to be drawn. However, where an obstruction is encountered in the floor and it is necessary to go onto a slightly raised platform, it is possible to jack the trailer forward end to a greater distance from the floor. This is useful where the trailers are drawn on and off elevators and the cab floor is not perfectly registered with the landing. This jacking is accomplished by swinging downwardly on the handle and bringing the pintle 27 into engagement with the groove 30. The pintle 27 is at all times disposed in line with the groove 30 so that irregardless of the steering position of the handle, the pintle 27 will always engage into the groove. Further drawing down of the handle through the previously described engagement causes the trailer forward end to be raised on the pintle 27. This upward movement of the trailer naturally lifts the fifth-wheel off the normal propelling king pin connection and for this reason the groove 30 is made semi-circular, so that the draft connection is still had through the jack pintle connection, the draft thrusts being against either side of the groove.

As the truck is again lowered to normal draft position, there having been no disalignment of the king pin 21 in relation to its socket, the operator merely lowers the trailer forward end and the socket is again engaged over the king pin 21. In the event that there has been a steering movement at the time that the trailer was lifted over the end the operator merely swings the truck, with the pintle 27 as a pivot point, and brings the king pin 21 back into vertical alignment with its socket.

The lifting pintle 27 may or may not be in engagement with the groove 30 during normal propelling conditions, depending upon the operator.

As a safety device for preventing sudden upper swing of the handle as the steering truck tends to skid out from under the end of the loaded trailer, an automatic stop device 31 is provided. This stop device is in the nature of swinging rollers depending from the web 22 of the body. It comprises a pair of links 32 secured at each side of the web on the opposite ends of a pivot rod 33, having its axis parallel with the axle of the truck. This pivot rod 33 is in two parts, the outer sleeve 34 thereof having squared link engaging ends so as to bind the links together for a common swinging movement.

The web 22 has circular bosses at each side thereof and the intermediate or circular portion of the sleeve 34 is of sufficient length to allow easy swing of the links at each side of the web. A bolt 35 extends through the sleeve for securing the links 32 upon the ends of the sleeve. Rollers 36 are loosely mounted on the lower ends of the links upon studs 37, these rollers 36 being on the outer sides of the links. This construction provides a swinging stop which, as shown in Figure 3, depends perpendicularly from the body truck by gravity action induced by the weight of the rollers and the links, the connection of the device to the web being sufficiently loose so that no interference is had to the swinging of the device.

The action of the stop device is to strike the ground in a perpendicular line irrespective of the position of the truck in relation to the trailer, so that as the handle suddenly swings upward the rollers 36 strike the ground and prevent further upward swing. However, in order to disengage the truck from the trailer fifth-wheel it is only necessary to raise the handle and allow the rollers 36 to strike the ground and then move the truck so that the perpendicular alignment of the device is broken and the stop rollers will then swing into inoperative position, as shown in Figure 1, allowing the disengagement of the truck. As designed, the rollers can be rendered inoperative either by forward or backward movement of the truck, the links 32 being spread apart at their lower ends so as to clear the body portion 13 of the truck in the event that they are swung toward the same.

Having described my invention, I claim:

1. A steering truck adaptable for propelling semi-wheeled trailers of the type having rests and a socket at the forward end, comprising, a truck body having a single axle, a handle extending upward from said body, a king pin formed on the upper side of the body for draft engagement with said socket by truck rotation, and a stop device mounted on the body for coaction with the surface over which the truck is being moved to prevent accidental uncoupling rotation of said truck body.

2. A steering truck adapted to lift and make draft connection to the forward rest end of a semi-wheeled trailer, comprising, a body having a single axle and rotatable thereon, said body having an extension formed thereon for draft engagement under said trailer end, a stop for limiting accidental uncoupling rotation of said truck body, and means for raising said trailer forward end beyond the height of normal draft connection.

3. The combination of a load carrying platform having wheels at its rear end and a separable truck under its forward end, said truck rotatable on its axle, a handle for said truck, an upper fifth wheel secured centrally of said platform forward under side, a king pin formed on said truck and engaging with a socket in said fifth wheel, a groove in said upper fifth wheel disposed circumferentially of the socket, and a pintle on said truck adapted to engage said groove, whereby downward thrusts on the handle engages said pintle in the groove and jacks the trailer forward end to a greater height than the normal draft connection.

4. The combination of a rear wheeled trailer and a single axled steering truck, a socket element centrally secured to the trailer forward under side, said truck having a king pin and a stud formed on its upper side, said king pin engaging in said socket, and said stud adapted to be engaged with the under side of the socket element by truck rotation on its axle for raising the trailer end to a greater height than normal draft connection, and means on said socket member for a draft connection with said stud.

5. A load carrying platform having rear wheels and a forward steering truck, said truck connected to said platform through a king pin and socket connection, a handle on said truck, said truck rotatable on its axle, a stud formed on said truck engageable with the trailer under side for jacking the trailer end beyond normal draft height, and said trailer underside having a recess formed therein engageable by said stud for a secondary draft connection.

6. In a steering truck adaptable for propelling semi-wheeled trailers having rests and a socket at the forward end, a truck body, a single axle therefor, a handle for said truck, a king pin formed on the upper side of the body for draft engagement with said socket, said draft engagement accomplished by truck rotation on its pivot, and a swinging stop pivoted to and depending from the forward end of said body, said stop disposed for engagement with the ground after slight downward movement of the trailer.

7. In the combination of a rear wheel trailer and a separable steering unit, a body for said truck, a single axle therefor, a handle for the truck, a fifth wheel connection between the trailer and truck, said truck rotatable on its axle, a link swingly attached to the truck body and depending perpendicularly therefrom, and a roller mounted on the lower end of the link, said roller disposed slightly distant from the ground when the truck is in normal coupled condition, said link and roller constituting a stop to prevent upward swing of the handle, and rendered inoperative for said action by forward or backward movement of the truck.

In witness whereof, I hereunto subscribe my name.

GEORGE J. KALBERER.